H. DISSTON.
CIRCULAR-SAW.
No. 192,240. Patented June 19, 1877.
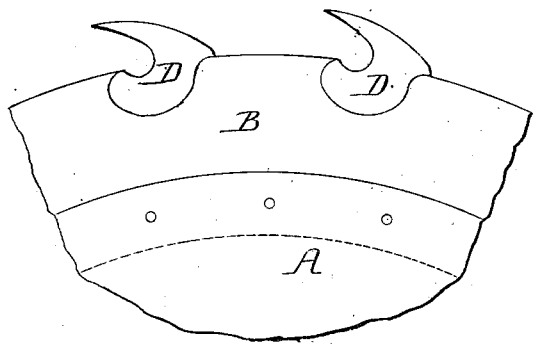
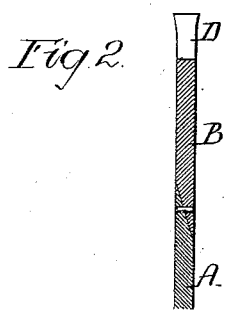

UNITED STATES PATENT OFFICE.

HENRY DISSTON, OF PHILADELPHIA, PENNSYLVANIA.

IMPROVEMENT IN CIRCULAR SAWS.

Specification forming part of Letters Patent No. 192,240, dated June 19, 1877; application filed February 16, 1877.

*To all whom it may concern:*

Be it known that I, HENRY DISSTON, of Philadelphia, Pennsylvania, have invented a new and useful Improvement in Circular Saws, of which the following is a specification:

The main object of my invention is to utilize such large circular saws as have been reduced in diameter by constant gumming, by combining therewith a repeated ring provided with detachable teeth.

The renewal of a worn-out circular-saw blade has been accomplished by turning away the teeth and securing to the disk thus formed a continuous toothed ring, which, when reduced by gumming, must be replaced by an entire new toothed ring. This plan, which I here disclaim, is costly, for if the ring be cut from a plate there must necessarily be a great sacrifice of material, and if the ring be made by rolling special costly machinery must be designed and constructed for the purpose.

By adopting my invention, the ring used to increase the diameter of the saw will require no renewal, for I combine it with detachable teeth, which can be readily removed and replaced with new ones without disturbing the ring. The combination, too, of the ring with the detachable teeth and central disk enables me to obviate a defect common to ordinary circular saws with detachable teeth, as explained hereafter.

In the accompanying drawing, Figure 1 is a side view of part of a circular saw made according to my invention, and Fig. 2 a transverse section on the line 1 2.

A represents part of the central disk of the saw, the latter being beveled to correspond with a similar bevel on the ring, as shown in Fig. 2, and the two being riveted together.

The ring B is recessed at intervals for the reception of detachable teeth, which are, by preference, of the character shown in the drawing, although different styles of teeth may be used in carrying out my invention.

In inserting teeth into ordinary circular saws there is always more or less distortion of the blade; hence I first insert the teeth into the ring and remove all distortions of the latter, and afterward fit and secure the ring to the central disk, which retains its truth. In other words, I make use of the ring as a medium for preventing the distortion of the blade by the teeth.

Another advantage of the combination described is that the ring can be made of metal inferior to that required if the teeth form a part of the ring.

It will be evident that although the application of the ring to a reduced saw for the purpose of increasing its diameter is an expensive operation, the fact that no renewal of the ring will be required renders my improved saw much more economical than one composed of a toothed ring and central disk.

I claim as my invention—

A circular saw in which a central disk, A, ring B, and detachable teeth D are combined, substantially in the manner set forth.

In testimony whereof I have signed my name to this specification in the presence of two subscribing witnesses.

HENRY DISSTON.

Witnesses:
 HERMANN MOESSNER,
 HARRY SMITH.